(12) United States Patent
Gloss

(10) Patent No.: US 6,554,349 B2
(45) Date of Patent: Apr. 29, 2003

(54) WINDBREAK DEVICE FOR A MOTOR VEHICLE

(75) Inventor: Bernhard Gloss, Brackenheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/022,813

(22) Filed: Dec. 20, 2001

(65) Prior Publication Data

US 2002/0089214 A1 Jul. 11, 2002

(30) Foreign Application Priority Data

Dec. 21, 2000 (DE) .......................................... 100 63 770

(51) Int. Cl.[7] .............................................. B62D 37/02
(52) U.S. Cl. ...................................... 296/180.1; 296/85
(58) Field of Search ........................... 296/180.1, 180.2, 296/180.4, 85

(56) References Cited

U.S. PATENT DOCUMENTS

| | | | | |
|---|---|---|---|---|
| 4,592,571 A | * | 6/1986 | Baumann et al. | 296/180.1 |
| 5,186,469 A | * | 2/1993 | Terris | 473/478 |
| 5,211,718 A | * | 5/1993 | Gotz et al. | 296/180.1 |
| 5,244,213 A | * | 9/1993 | Armell | 273/400 |
| 5,253,916 A | * | 10/1993 | Moore et al. | 296/85 |
| 5,318,337 A | * | 6/1994 | Gotz et al. | 296/85 |
| 5,566,952 A | * | 10/1996 | Mullin et al. | 273/400 |
| 5,658,039 A | * | 8/1997 | Bennett | 296/85 |
| 5,738,404 A | * | 4/1998 | Stadler et al. | 296/180.1 |
| 6,409,410 B1 | * | 6/2002 | Huang | 403/112 |

FOREIGN PATENT DOCUMENTS

DE      19709602 A1      9/1998

* cited by examiner

Primary Examiner—D. Glenn Dayoan
Assistant Examiner—Lori L. Coletta
(74) Attorney, Agent, or Firm—Crowell & Moring LLP

(57) ABSTRACT

A windbreak device for a motor vehicle, in particular for an open passenger vehicle, has a lower frame which can be attached to the vehicle, an upper frame which is mounted on the lower frame so as to be capable of pivoting about a pivot axis, and at least one flexible, planar windbreak element which is mounted on the frames. In order to simplify the design of such a windbreak device, it is proposed that both frames be of C-shaped construction, with open sides facing the pivot axis, and to provide a common windbreak element, for both frames, attached to both frames.

34 Claims, 2 Drawing Sheets

WINDBREAK DEVICE FOR A MOTOR VEHICLE

This application claims the priority of German application 100 63 770.1, filed Dec. 21, 2000, the disclosure of which is expressly incorporated by reference herein.

The present invention relates to a windbreak device for a motor vehicle, in particular an open passenger vehicle, having a lower frame which can be attached to the vehicle with attachment means, an upper frame which is mounted on the lower frame so as to be capable of pivoting about a pivot axis, and at least one flexible, planar windbreak element which is mounted on the frames.

German publication DE 197 09 602 A1 discloses a windbreak device which has a lower frame which can be attached to a vehicle with attachment means. An upper frame of this windbreak device is mounted on the lower frame so as to be capable of pivoting about a pivot axis. This pivot axis extends approximately transversely with respect to the longitudinal direction of the vehicle when the windbreak device is in an installed state. Each of the two frames is of closed construction on all sides and is fitted with a flexible, planar windbreak element in the form of a mesh or net.

In an open passenger vehicle, or convertible, such a windbreak device is mounted behind the series of front seats of the convertible, approximately at the height of upper ends of the backrests. The lower frame here can cover a loading space which adjoins the series of front seats at the rear. In a lowered position, the upper frame is folded back, and in an upright position, the upper frame is folded up. As a result, a net, which is stretched taut by the upper frame, becomes positioned behind the headrests of the series of front seats. In this upright position, a windbreak is effective for the passengers in the series of front seats.

The present invention is concerned with providing a windbreak device of the type mentioned above which requires fewer components and is thus more cost-effective to manufacture.

One way in which this problem is solved according to the invention is by making both frames C-shaped with open sides facing the pivot axis, and by having the windbreak element be a common windbreak element provided for both frames and attached to both frames.

The invention is based on the general idea of constructing the two frames in a C-shape, mounting them on one another in the region of their open sides and using them to stretch taut a common windbreak element. Because the frames, according to the invention, are open on one side, they can be manufactured more easily than conventional frames, which are closed on all sides. Accordingly, the windbreak device according to the invention can be manufactured more cost-effectively.

According to one preferred embodiment, the windbreak element can be constructed in such a way that, in an upright position of the upper frame, in which the upper frame protrudes upwards from the lower frame, the windbreak element has a surface, with one or more concave curvatures, on an inner side facing the pivot axis. This permits access to the space arranged underneath the lower frame on the inner side of the windbreak element. In particular, when the lower frame covers a loading space which adjoins the series of front seats, this loading space is easy to access even when the windbreak device is installed.

The spatial shape of the windbreak element, which is stretched taut in the upright position of the upper frame, can be implemented, for example, by cutting the windbreak element to shape in a corresponding way, by integrating tapes, cords or the like, which are less flexible than the rest of the material of the windbreak element, into the windbreak element, and/or by way of the material of the windbreak element having different degrees of elasticity in different directions.

In another embodiment, a crossmember which extends between the C limbs of the upper frame and is attached thereto by its ends, near to or on the pivot axis of the upper frame, can be provided. The windbreak element is also attached to the crossmember. This makes it possible to achieve, by way of the crossmember, a desired spatial shape for the windbreak element in the upright position of the upper frame. In addition, the windbreak element, which is stretched taut, thus obtains a higher dimensional stability so that, for example, relative movements as a result of the action of the wind can be reduced. Furthermore, the crossmember increases the rigidity of the windbreak device.

In one preferred embodiment, in its lowered position, the upper frame can rest with its rear side on an upper side of the lower frame. This results in a particularly space-saving way of accommodating the windbreak device in the lowered position.

According to one particularly advantageous embodiment, the crossmember can be dimensioned and inclined with respect to the upper frame in such a way that the section of the windbreak element which is mounted on the crossmember and on the lower frame is adjusted, when the upper frame pivots, out of a stressed state assigned to the lowered position of the upper frame, via an unstressed state assigned to an intermediate position of the upper frame, into a stressed state assigned to the upright position of the upper frame. This ensures that the windbreak element is stressed both in the upright position and in the lowered position of the upper frame and is thus relatively insensitive to relative movements, for example as a result of the action of the wind.

The windbreak element can then be stretched taut in a particularly dimensionally stable fashion if, according to one specific embodiment, it is attached essentially along its entire circumference to the frames.

Further important features and advantages of the invention will be apparent from the dependent claims, from the drawings, and from the associated description of the figures.

Of course, the features which are mentioned above and are to be explained below can be used not only in the respectively given combination but also in other combinations or in isolation, without departing from the scope of the present invention.

A preferred exemplary embodiment of the invention is illustrated in schematic form in the drawings and is explained in more detail in the following description. A process of moving the windbreak device is also disclosed and claimed.

DESCRIPTION OF THE PREFERRED EMBODIMENTS

Figure 1:
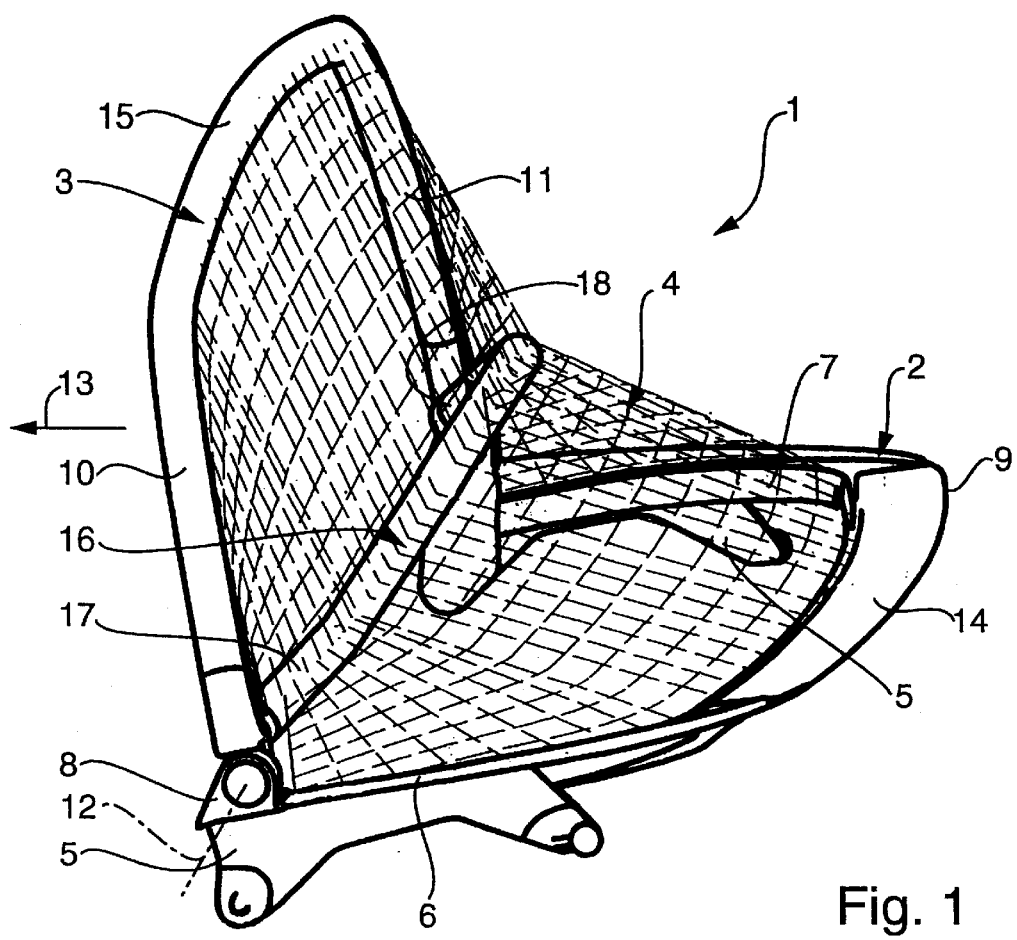
FIG. 1 is a perspective view of a windbreak device according to the invention in an upright position.
Figure 2:
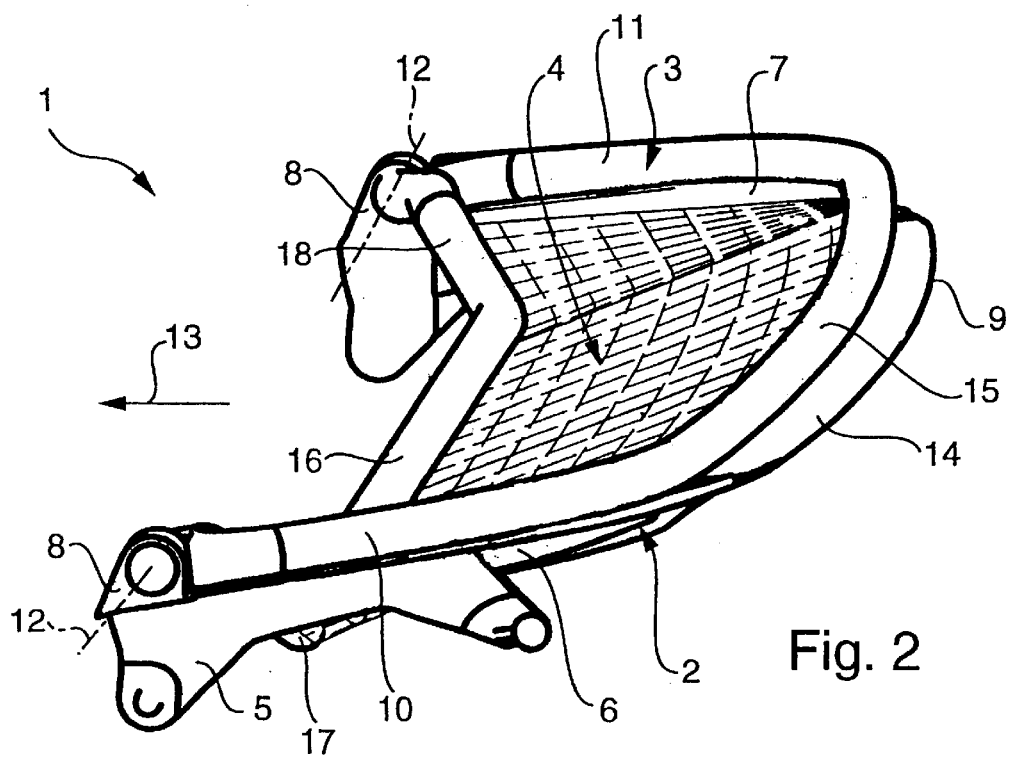
FIG. 2 is a perspective view similar to FIG. 1 but showing the device in a lowered position.

According to FIGS. 1 to 4, a windbreak device 1 according to the invention has a lower frame 2, an upper frame 3 and a windbreak element 4.

On its underside, the lower frame 2 has on each side attachment means 5 with which the windbreak device 1 can be attached to a motor vehicle (not illustrated), in particular to an open passenger vehicle (convertible). The lower frame 2 is of C-shaped construction so that C limbs 6 and 7 of the lower frame 2 end in a free arrangement at the open side of the lower frame 2. At the free ends of the C limbs 6 and 7, in each case a bearing 8, by way of which the upper frame 3 is mounted on the lower frame 2, is arranged on the upper side of the lower frame 2, on each side. The lower frame 2 is preferably dimensioned in such a way that it completely covers a loading space which, in an open passenger vehicle, directly adjoins a series of front seats toward the rear in the direction of travel. For this purpose, the lower frame 2 is equipped with a laterally projecting collar 9 which extends along the entire lower frame 2 on its outer side and which rests on an upper recess part in the aforesaid loading space.

Figure 3:
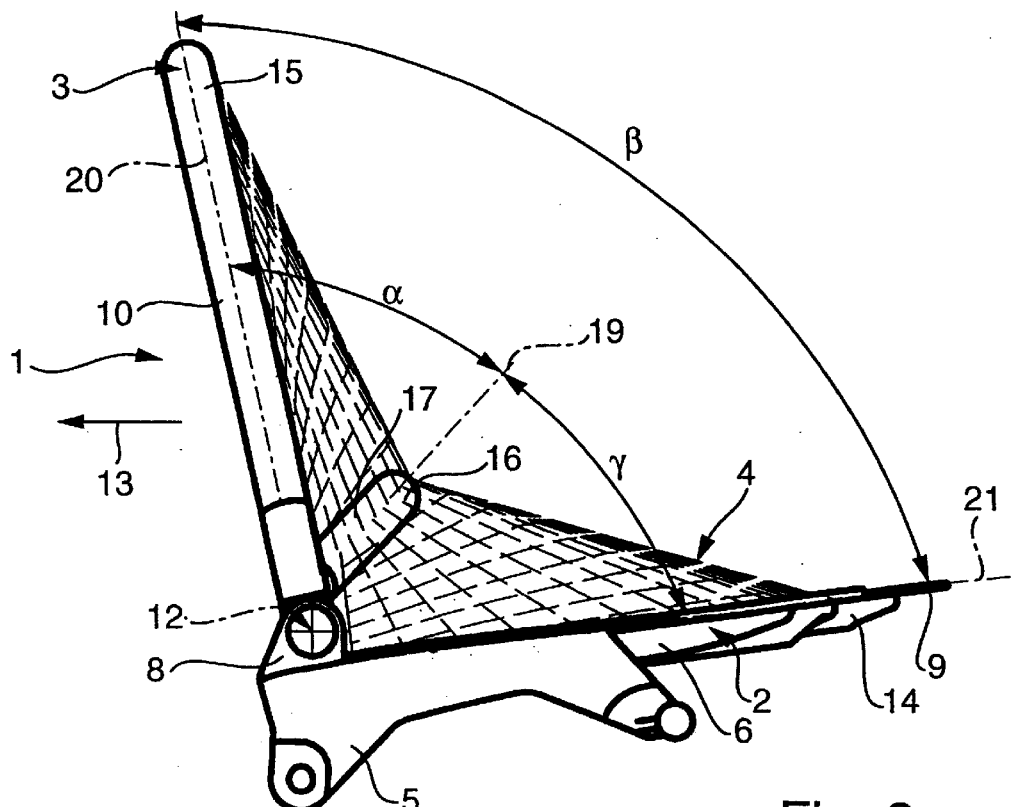
FIG. 3 is a side view of the windbreak device according to FIG. 1.

The upper frame 3 also has a C shape, with the C limbs 10 and 11 of the upper frame 3 ending in a free arrangement at the open side of the upper frame 3. The upper frame 3 is mounted at the free ends of its C limbs 10 and 11 by way of the bearings 8 so as to be capable of pivoting about a pivot axis 12, running transversely with respect to a direction of travel 13 symbolized by an arrow, on the lower frame 9. In FIGS. 1 and 3, an upright position of the upper frame 3 is represented. In the upright position, the frame protrudes upwards from the lower frame 2 in an essentially perpendicular direction. In this upright position of the upper frame 3, the windbreak device 1 provides the desired protection from the wind when the top of the convertible is opened. If this wind protection is not required, for example when the top is closed, the upper frame 3 can be pivoted back, with respect to the direction of travel 13, about the pivot axis 12 into a lowered position corresponding to FIGS. 2 and 4. In this lowered position, the upper frame 3 rests flush with its rear side on the upper side of the lower frame 2. In the embodiment shown here, the upper frame 3 and lower frame 2 are also dimensioned in such a way that in its lowered position the upper frame 3 rests approximately congruently on the lower frame 2. A particularly space-saving out-of-use state for the windbreak device 1 is obtained in the lowered position of the upper frame 3 by virtue of the fact that both the lower frame 2 and the upper frame 3 are of flat construction so that in the lowered position the frames 2 and 3 bear against one another along their C limbs 6, 7 and 10, 11, respectively, and in particular along their respective C bases 14 and 15.

In order to be able to fix the upper frame 3 at least in one of its limit positions (upright position and lowered position) and in particular also in at least one intermediate position, appropriate securing means, latching means or locking means can be provided.

The windbreak element 4 is composed of a flexible and planar material. The windbreak element 4 is preferably formed from a mesh or net or from some other transparent woven fabric. The windbreak element 4 is attached to the frames 2 and 3 along its entire circumference.

The windbreak element 4 can be composed in particular of a rubber-elastic material in order to be able to assume a taut and stretched contour at least in the upright position. In the upright position of the upper frame 3, the windbreak element 4 has a particular spatial shape such that an inner side of the windbreak element 4 facing the pivot axis 12 has a surface with at least one concave curvature; here the surface has a plurality of such concave curvatures. This particular feature enables the loading space (not shown) underneath the lower frame 2 to be easily accessed from the front, that is to say from the inner side of the windbreak element 4, especially when the upper frame 3 is raised into its upright position.

This three-dimensional shape of the windbreak element 4 in the upright position is made possible in the embodiment illustrated in the figures by way of a crossmember 16 which extends between the free ends of the C limbs 10, 11 of the upper frame 3 and is attached to the upper frame 3 near the pivot axis 12. In addition, this crossmember 16 is arranged on the inner side of the windbreak element 4 and permanently connected there to the windbreak element 4. The desired spatial shape for the windbreak element 4 can be achieved in the upright position of the upper frame 3 by appropriate shaping and positioning of the crossmember 16.

Alternatively, this desired spatial shape of the windbreak element 4 can basically also be obtained without such a crossmember 16. For example, instead of the crossmember 16, a rubber band or the like can be mounted on the windbreak element 4. Alternatively, or in addition, the cutting to size and selected orientation of the elasticity in the material can be selected such that the desired spatial curvature of the windbreak element 4 comes about in the upright position of the upper frame 3.

In addition to the selected spatial shaping of the windbreak element 4, the crossmember 16 used in the illustrated exemplary embodiment also brings about stiffening of the entire windbreak device 1, as a result of which its stability is increased. The crossmember 16 is of C-shaped construction, the free ends of its C limbs 17, 18 being attached to the upper frame 3 on its open side. The crossmember 16 protrudes from the upper frame 3 on the rear side of the upper frame 3 facing the lower frame 2.

According to FIG. 3, the crossmember 16 lies in a plane 19 which includes an acute angle $\alpha$ of inclination, which can be, for example, between 40° and 60°, on a side facing away from the pivot axis 12, with a plane 20 in which the upper frame 3 is located. In its upright position according to FIG. 3, the upper frame 3 protrudes more or less perpendicularly from the lower frame 2 so that an angle $\beta$, which can be preferably between 80° and 100°, is enclosed between the plane 20 of the upper frame 3 and a plane 21 in which the lower frame 2 is located, on the rear side of the upper frame 3 and on the upper side of the lower frame 2. The selected inclination of the crossmember 16 and the desired upright position of the upper frame 3 results in an orientation of the crossmember 16 in the upright position in which the plane 19 of the crossmember 16 includes an acute upright-positioning angle $\gamma$, which can preferably also be between 40° and 60°, with the plane 21 of the lower frame 2.

Figure 4:
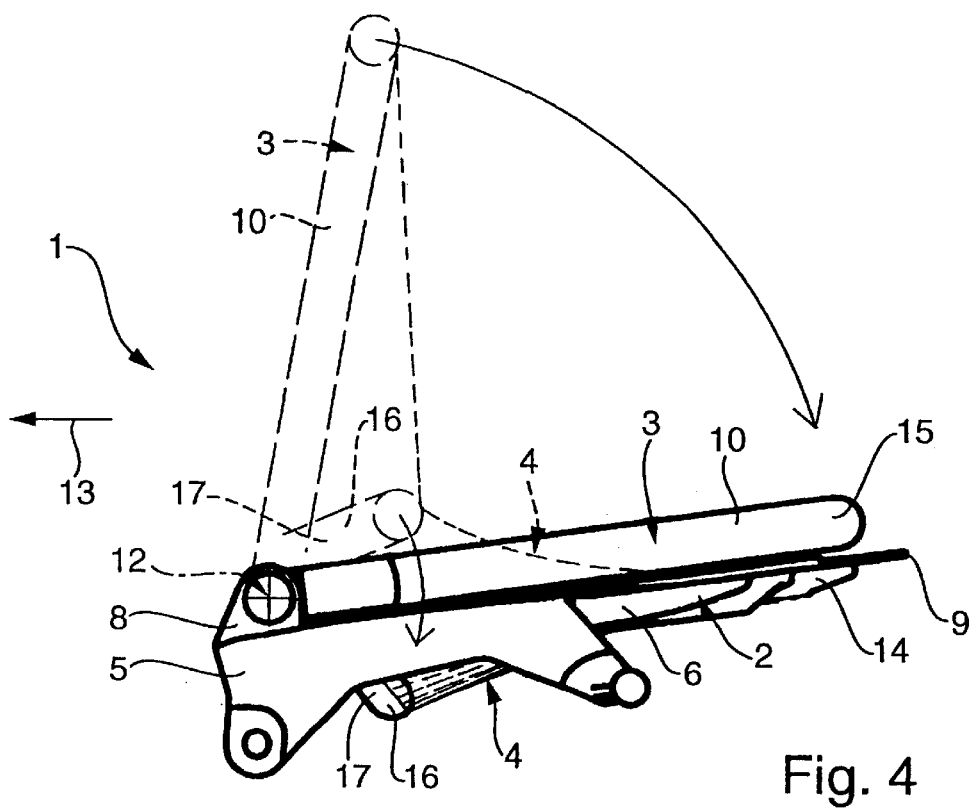
FIG. 4 is a side view of the windbreak device according to FIG. 2.

In FIG. 4, the upper frame 3 is represented in its lowered position by continuous lines. In addition, an intermediate position, which the upper frame 3 assumes during an adjustment operation between its upright position and its lowered position, is shown by dashed lines for the upper frame 3. The selected dimensioning and selected inclination of the crossmember 16 result in a section of the windbreak element 4 which is attached to the crossmember 16 and to the lower frame 2 being in an unstressed state in the intermediate position. The windbreak element 4 is in a stressed state in the lowered position according to FIG. 4 and in the upright position according to FIG. 3, respectively. This means that a rigid shape can be ensured for the windbreak element 4 both in the upright position and in the lowered position of the upper frame 3 so that, for example, disruptive relative movements of the windbreak element 4 owing to the action of the wind can be suppressed.

As a result of the crossmember 16, free access to the loading space arranged underneath the lower frame 2 is also made possible in the lowered position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A windbreak device for a motor vehicle comprising:
   a lower frame which can be attached to the vehicle with attachment means,
   an upper frame which is mounted on the lower frame so as to be capable of pivoting about a pivot axis,
   at least one flexible, planar windbreak element which is mounted on the frames, and
   a crossmember which extends between limbs of the upper frame and is attached thereto near to or on the pivot axis,
   wherein both frames have open sides facing the pivot axis, and
   wherein said windbreak element is a common windbreak element attached to both frames and to the crossmember.

2. The windbreak device according to claim 1, wherein the windbreak element is constructed in such a way that, in an upright position of the upper frame in which the upper frame protrudes upwards from the lower frame, it has a surface, with one or more concave curvatures, on an inner side facing the pivot axis.

3. A windbreak device for a motor vehicle comprising:
   a lower frame which can be attached to the vehicle with attachment means,
   an upper frame which is mounted on the lower frame so as to be capable of pivoting about a pivot axis, and
   at least one flexible, planar windbreak element which is mounted on the frames,
   wherein both frames are of C-shaped construction with open sides facing the pivot axis,
   wherein said windbreak element is a common windbreak element provided for both frames and attached to both frames,
   wherein a crossmember is provided which extends between C limbs of the upper frame and is attached thereto by its ends, near to or on the pivot axis, and
   wherein the windbreak element is also attached to the crossmember.

4. The windbreak device according to claim 3, wherein the crossmember has a C-shaped construction with its open side facing the upper frame.

5. The windbreak device according to claim 3, wherein the crossmember protrudes from the upper frame at a rear side of the upper frame facing the lower frame.

6. The windbreak device according to claim 1, wherein, in a lowered position, the upper frame rests with its rear side on an upper side of the lower frame.

7. The windbreak device according to claim 6, wherein the frames are dimensioned and shaped in such a way that, in the lowered position of the upper frame, they rest approximately congruently one on top of the other.

8. The windbreak device according to claim 4, wherein the crossmember is inclined with respect to the upper frame in such a way that the crossmember encloses, in a side view on the side facing away from the pivot axis, an acute angle α of inclination with the upper frame.

9. The windbreak device according to claim 8, wherein the inclination of the crossmember and an upright position of the upper frame are matched to one another in such a way that, in the upright position, the crossmember encloses, in a side view on the side facing away from the pivot axis, an acute upright-positioning angle γ with the lower frame.

10. The windbreak device at least according to claim 3, wherein the crossmember is dimensioned and inclined with respect to the upper frame in such a way that the section of the windbreak element which is attached to the crossmember and to the lower frame is adjusted, during pivoting of the upper frame, out of a stressed state assigned to a lowered position of the upper frame, via an unstressed state assigned to an intermediate position of the upper frame, into a stressed state assigned to an upright position of the upper frame.

11. The windbreak device according to claim 1, wherein the windbreak element is composed of an elastic mesh or net or transparent woven fabric.

12. The windbreak device according to claim 1, wherein the windbreak element is attached essentially along its entire circumference to the frames.

13. The windbreak device according to claim 1, wherein the lower frame is dimensioned in such a way that it completely covers a loading space which directly adjoins a series of front seats towards the rear in the direction of travel.

14. The windbreak device according to claim 1, wherein the motor vehicle is an open passenger vehicle.

15. A windbreak device for a motor vehicle comprising:
    a lower frame which can be attached to the vehicle with attachment means,
    an upper frame which is mounted on the lower frame so as to be capable of pivoting about a pivot axis, and
    at least one flexible, planar windbreak element which is mounted on the frames,
    wherein both frames are of C-shaped construction with open sides facing the pivot axis,
    wherein said windbreak element is a common windbreak element provided for both frames and attached to both frames,
    wherein the windbreak element is constructed in such a way that, in an upright position of the upper frame in which the upper frame protrudes upwards from the lower frame, it has a surface, with one or more concave curvatures, on an inner side facing the pivot axis,
    wherein a crossmember is provided which extends between C limbs of the upper frame and is attached thereto by its ends, near to or on the pivot axis, and
    wherein the windbreak element is also attached to the crossmember.

16. The windbreak device according to claim 15, wherein the crossmember has a C-shaped construction with its open side facing the upper frame.

17. The windbreak device according to claim 15, wherein the crossmember protrudes from the upper frame at a rear side of the upper frame facing the lower frame.

18. The windbreak device according to claim 16, wherein the crossmember is inclined with respect to the upper frame in such a way that the crossmember encloses, in a side view on the side facing away from the pivot axis, an acute angle α of inclination with the upper frame.

19. The windbreak device according to claim 18, wherein the inclination of the crossmember and an upright position of the upper frame are matched to one another in such a way that, in the upright position, the crossmember encloses, in a side view on the side facing away from the pivot axis, an acute upright-positioning angle γ with the lower frame.

20. The windbreak device at least according to claim 15, wherein the crossmember is dimensioned and inclined with respect to the upper frame in such a way that the section of the windbreak element which is attached to the crossmember and to the lower frame is adjusted, during pivoting of the upper frame, out of a stressed state assigned to a lowered position of the upper frame, via an unstressed state assigned to an intermediate position of the upper frame, into a stressed state assigned to an upright position of the upper frame.

21. A windbreak device for a motor vehicle comprising:
a lower frame which can be attached to the vehicle,
an upper frame which is mounted on the lower frame so as to be capable of pivoting about a pivot axis,
a crossmember which extends between limbs of the upper frame and is attached thereto near to or on the pivot axis, and
a common flexible windbreak element attached to both frames and to the crossmember.

22. The windbreak device according to claim 21, wherein the windbreak element is constructed in such a way that, in an upright position of the upper frame in which the upper frame protrudes upwards from the lower frame, it has a surface, with one or more concave curvatures, on an inner side facing the pivot axis.

23. A windbreak device for a motor vehicle comprising:
a lower frame which can be attached to the vehicle,
an upper frame which is mounted on the lower frame so as to be capable of pivoting about a pivot axis, and
a common flexible windbreak element provided for both frames and attached to both frames,
wherein a crossmember is provided which extends between C limbs of the upper frame and is attached thereto by its ends, near to or on the pivot axis, and
wherein the windbreak element is also attached to the crossmember.

24. The windbreak device according to claim 23, wherein the crossmember has a C-shaped construction with its open side facing the upper frame.

25. The windbreak device according to claim 23, wherein the crossmember protrudes from the upper frame at a rear side of the upper frame facing the lower frame.

26. The windbreak device according to claim 21, wherein, in a lowered position, the upper frame rests with its rear side on an upper side of the lower frame.

27. The windbreak device according to claim 26, wherein the frames are dimensioned and shaped in such a way that, in the lowered position of the upper frame, they rest approximately congruently one on top of the other.

28. The windbreak device according to claim 24, wherein the crossmember is inclined with respect to the upper frame in such a way that the crossmember encloses, in a side view on the side facing away from the pivot axis, an acute angle α of inclination with the upper frame.

29. The windbreak device according to claim 28, wherein the inclination of the crossmember and an upright position of the upper frame are matched to one another in such a way that, in the upright position, the crossmember encloses, in a side view on the side facing away from the pivot axis, an acute upright-positioning angle γ with the lower frame.

30. The windbreak device at least according to claim 23, wherein the crossmember is dimensioned and inclined with respect to the upper frame in such a way that the section of the windbreak element which is attached to the crossmember and to the lower frame is adjusted, during pivoting of the upper frame, out of a stressed state assigned to a lowered position of the upper frame, via an unstressed state assigned to an intermediate position of the upper frame, into a stressed state assigned to an upright position of the upper frame.

31. The windbreak device according to claim 21, wherein the windbreak element is composed of an elastic mesh or net or transparent woven fabric.

32. The windbreak device according to claim 21, wherein the windbreak element is attached essentially along its entire circumference to the frames.

33. The windbreak device according to claim 21, wherein the lower frame is dimensioned in such a way that it completely covers a loading space which directly adjoins a series of front seats towards the rear in the direction of travel.

34. The windbreak device according to claim 21, wherein each of said frames has a C-shaped construction.

* * * * *